United States Patent
Yin et al.

[11] Patent Number: 6,060,162
[45] Date of Patent: *May 9, 2000

[54] PULSED VOLTAGE SURGE RESISTANT MAGNET WIRE

[75] Inventors: Weijun Yin, Fort Wayne; Donald J. Barta, Monroeville, both of Ind.

[73] Assignee: Phelps Dodge Industries, Inc., Fort Wayne, Ind.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/480,460

[22] Filed: Jun. 8, 1995

[51] Int. Cl.$^7$ ...................................................... D02G 3/00
[52] U.S. Cl. ......................... 428/372; 428/375; 428/379; 428/380; 428/383; 428/384; 428/386; 428/387; 428/389; 174/110 A; 174/110 E; 174/110 N; 174/110 PM; 174/110 SR; 174/120 SR; 174/127
[58] Field of Search ..................................... 428/372, 378, 428/379, 280, 383, 384, 386, 387, 389; 174/120 SR, 110 A, 110 SR, 110 N, 110 PM, 110 E, 127, 118, 110 R

[56] References Cited

U.S. PATENT DOCUMENTS

| | | | |
|---|---|---|---|
| 1,943,115 | 1/1934 | Ellis | 175/21 |
| 2,888,424 | 5/1959 | Precopio et al. | 260/41 |
| 2,935,427 | 5/1960 | Hall et al. | 117/218 |
| 3,228,883 | 1/1966 | Di Giulio et al. | 252/63.2 |
| 3,496,139 | 2/1970 | Markovitz | 260/47 |
| 3,519,670 | 7/1970 | Markovitz | 260/47 |
| 3,577,346 | 5/1971 | McKeown | 252/63.5 |

(List continued on next page.)

FOREIGN PATENT DOCUMENTS 0 396 928  11/1990  European Pat. Off. .

OTHER PUBLICATIONS

J.A. Oliver and G.C. Stone "Implication for the Application of Adjustable Speed Drive Electronics to Motor Stator Winding Insulation", IEEE Electrical Insulation Magazine, Jul./Aug. 1995, vol. 11, No. 4, pp. 32–36.

Weijun Yin, Keith Bultemeier, Don Barta and Dan Floryan, "Critical Factors for Early Failure of Magnet Wires in Inverter–Fed Motors", IEEE 1995 Annual Report Conference on Electrical Insulation and Dielectric Phenomena, pp. 258–261.

Weijun Yin, Keith Bultemeier, Don Barta and Dan Floryan, Dielectric Integrity of Magnet Wire Insulations Under Multi–Stresses, Proceeding of EEIC/EMCW, 1995, pp. 257–261.

Analysis of the Impact of Pulse–Width Modulated Inverter Voltage Waveforms on A.C. Induction Motors; Austin H. Bennett; U.S. Electrical Motors, Division of Emerson Electric Electric; no date.

Corena Resistant Turn Insulation in AC Rotating Machine; D.R. Johnston, J. T. LaForte; Gen. Elec. Co.; no date.

Effect of Surge Wave Reflection Inside a Motor on Voltage Distribution Across Stator Windings; O.M. Nassar; Aramco; Apr. 1985; Saudi Arabia.

*Primary Examiner*—William Krynski
*Assistant Examiner*—J. M. Gray
*Attorney, Agent, or Firm*—Barnes & Thornburg

[57] ABSTRACT

A pulsed voltage surge resistant magnet wire comprising a conductor, a continuous and concentric and flexible uniform coat of base insulation material superimposed on the conductor. An essentially continuous and concentric and uniform pulsed voltage surge shield overlaying the coat of base insulation material. The shield has therein an effective amount of a particulate material. The shield is superimposed on the coat of base insulation material, and has a continuous and concentric and flexible and uniform top coat of insulation material superimposed thereon.

36 Claims, 1 Drawing Sheet

U.S. PATENT DOCUMENTS

| | | | |
|---|---|---|---|
| 3,645,899 | 2/1972 | Linson | 252/63.5 |
| 3,742,084 | 6/1973 | Olyphant, Jr. et al. | 252/63.7 |
| 3,802,913 | 4/1974 | MacKenzie . | |
| 3,812,214 | 5/1974 | Markovitz | 260/448.2 |
| 3,878,319 | 4/1975 | Wahl | 174/110 AR |
| 4,049,748 | 9/1977 | Bailey | 260/861 |
| 4,102,851 | 7/1978 | Luck | 252/63.5 |
| 4,331,733 | 5/1982 | Evans . | |
| 4,342,814 | 8/1982 | Usuki et al. . | |
| 4,354,965 | 10/1982 | Lee et al. . | |
| 4,385,136 | 5/1983 | Ancker et al. . | |
| 4,403,061 | 9/1983 | Brooks et al. | 524/433 |
| 4,405,687 | 9/1983 | Morita et al. . | |
| 4,426,423 | 1/1984 | Intrater et al. . | |
| 4,476,192 | 10/1984 | Imai et al. . | |
| 4,493,873 | 1/1985 | Keane et al. | 428/372 |
| 4,503,124 | 3/1985 | Keane et al. | 428/372 |
| 4,537,804 | 8/1985 | Keane et al. | 428/372 |
| 4,546,041 | 10/1985 | Keane et al. | 428/372 |
| 4,563,369 | 1/1986 | Lavallee . | |
| 4,716,079 | 12/1987 | Sano et al. | 428/383 |
| 4,760,296 | 7/1988 | Johnston et al. | 428/372 |
| 4,795,339 | 1/1989 | Escallon . | |
| 4,806,806 | 2/1989 | Hjortsberg et al. | 428/324 |
| 4,826,706 | 5/1989 | Hilker et al. . | |
| 4,935,302 | 6/1990 | Hjortsberg et al. | 428/383 |
| 4,970,488 | 11/1990 | Horiike et al. | 174/120 SC |
| 5,061,554 | 10/1991 | Hjortsberg et al. | 428/383 |
| 5,066,513 | 11/1991 | Zurecki et al. . | |
| 5,171,937 | 12/1992 | Aldissi . | |
| 5,209,987 | 5/1993 | Penneck et al. . | |
| 5,296,260 | 3/1994 | Sawada et al. . | |
| 5,336,851 | 8/1994 | Sawada et al. | 774/110 A |
| 5,350,638 | 9/1994 | Sawada et al. . | |
| 5,393,612 | 2/1995 | Matsuura et al. . | |
| 5,425,992 | 6/1995 | Tachikawa et al. . | |
| 5,545,853 | 8/1996 | Hildreth . | |
| 5,552,222 | 9/1996 | Bolon et al. . | |
| 5,654,095 | 8/1997 | Yin et al. . | |

PULSED VOLTAGE SURGE RESISTANT MAGNET WIRE

BACKGROUND OF THE INVENTION

The present invention relates to an improved magnet wire, and more particularly, to an improved magnet wire which is highly resistant to repetitive or pulsed, high voltage spikes or surges.

Much has been written over the years about various types of variable frequency or pulse-width modulated (PWM) and/or inverter adjustable speed drives on AC motors and their affect on motor operation. PWM drives are known to have significant harmonics and transients which may alter the motor performance characteristics and life expectancy. The effects of maximum voltage, rate of rise, switching frequencies, resonances and harmonics have all been identified.

The PWM inverter is one of the newest and fastest evolving technologies in non-linear devices used in motor drive systems. The motivation for using PWM inverters is speed control of an AC motor comparable to the prior mechanical or DC adjustable speed drives without loss of torque. With the increased emphasis of energy conservation and lower cost, the use of higher performance PWM drives has grown at an exponential rate. However, it has been found that these PWM drives cause premature failure of the magnet wire insulation systems used in such AC motors.

It is therefore highly desirable to provide an improved magnet wire for use in AC motors having variable frequency or PWM and/or inverter drives.

It is also highly desirable to provide an improved magnet wire which has increased resistance to insulation degradation caused by pulsed voltage surges.

The basic stresses acting upon the stator and rotor windings can be broken down into thermal stresses, mechanical stresses, dielectrical stresses and environmental stresses. All of these stresses are impacted by voltage, voltage wave forms and frequencies, in that the longevity of the winding is predicated upon the integrity of the whole insulation system. During the early stages of applying various voltages, voltage wave forms and frequencies to AC motors, the major focus was on the thermal stress generated by the unwanted drive harmonics passing through to the motor and the associated heating. The other critical factor dealt with the increased heating caused by reduced cooling capacity at slower speeds. While more attention was given initially to rotor bar shapes than to stator insulation voltage withstand capability, the present drive technology, which uses much higher switching rates (sometimes referred to as carrier frequencies) requires the focus to involve both the stator winding system and the rotor winding system.

The standard magnet wire used by most motor manufacturers is typically class H magnet wire. In accordance with the ANSI/NEMA magnet wire standard (ANSI/NEMA MW 1000-1993), this wire, under ideal conditions (twisted wire pair tests) is capable of a withstand voltage of 5,700 volts at a rise time not to exceed 500 volts per second. However, it has been found that utilizing current drive technology, a magnet wire may have to withstand voltage surges approaching 3,000 volts, voltage rises from about 1.0 kv per microsecond to about 100 kV per microsecond, frequencies from about 1 kHz to about 20 kHz, and temperatures for short periods of time approaching 300° C. It has also been found that in certain circumstances, a surge is reflected so as to reinforce a primary surge wave voltage at succeeding coils to produce front times exceeding 3 micro seconds in subsequent coils.

These values are based upon the assumption that the wire film is applied concentrically to the conductor and that no appreciation of film thickness occurs in the manufacturing process or operation of the motor at high operating temperatures or that turn to turn bond strength may decrease significantly. Hence, coil movement and abrasion that reduce the thickness of the turn insulation over time can cause premature failure of the turn insulation.

Therefore, it is highly desirable to provide an improved magnet wire which can withstand voltage surges approaching 3,000 volts having rise times of less than 100 kV per micro second and temperature rises to 300° C., frequencies of less than 20 kHz after the insertion of the windings in a motor rotor and stator at normal operating temperatures over the anticipated lifetime of the motor.

It is also highly desirable to provide an improved magnet wire which will pass the ANSI/NEMA magnet wire standards MW1000 and in addition ANSI/NEMA MG1-Parts 30 and 31 being developed for constant speed motors on a sinusoidal bus and general purpose induction motors used with variable frequency controls, or both, and definite purpose inverter fed motors, respectively.

A number of investigations to determine more accurately the voltage endurance levels of the present proposed insulation systems preliminarily indicate that the transient voltage levels combined with the operating temperatures of such motors can exceed corona starting levels. Some have blamed corona for the insulation failures in motors having variable frequency, PWM and/or inverter drives. Others have discounted corona as the culprit inasmuch as failure occurred in portions of the winding where the electrical field is low. While it is known that conventional enamels degrade when exposed to high voltage corona discharge, and that corona is discharged between adjacent windings of motor insulation, due to the inevitable voids and the high voltage ionization of air in the voids of the motor stator and rotor insulation windings, it has been found that insulation failure of motors driven by variable frequency, PWM and/or inverter drives is not primarily a corona insulation degradation mechanism.

Corona aging and magnet wire failure conditions may be distinguished from pulsed voltage surge aging and magnet wire failure conditions. Corona aging conditions occur in the presence of a gas (usually air in magnet wire windings) at positions of localized high electrical stress (AC or DC), that is strong enough to break down or ionize the gas, to produce electron or ion energy strong enough to break down polymer chains or to create ionic radicals via chemical reactions. The chemical reactions result in polymer degradation. Corona discharge is a relatively "cold discharge" and temperature is usually not a substantial factor. Magnet wire aging/failure due to corona is usually a long-term process.

In contrast, pulsed voltage surge aging and magnet wire failure does not require the presence of a gas media. Pulsed voltage surge failure instead requires repetitive or pulsed voltage surges having relatively short rise times, or high voltage to rise time ratios, relatively high frequency of pulse and relatively high impulse energy, and occurs in relatively high temperatures generated thereby. Given high voltages and minimum rise times, pulsed voltage surge failure can occur relatively quickly, and is believed to be the predominant cause of failure in variable frequency, PWM, and/or inverter driven motors.

It is therefore highly desirable to provide an improved magnet wire which meets all of the performance characteristics desired by motor manufacturers for stator and rotor windings for use under corona discharge conditions.

Finally, it is also highly desirable to provide an improved magnet wire which possesses all of the above-identified features.

SUMMARY OF THE INVENTION

It is therefore an object of the invention to provide an improved magnet wire for use in AC motors having variable frequency or PWM and/or inverter drives.

It is also an object of the invention to provide an improved magnet wire which has increased resistance to insulation degradation caused by pulsed voltage surges.

It is also an object of the invention to provide an improved magnet wire which can withstand voltage surges approaching 3,000 volts having rise times of less than 100 kV per micro second and temperature rises to 300° C. frequencies of less than 20 kHz after the insertion of the windings in a motor rotor and stator at normal operating temperatures over the anticipated lifetime of the motor.

It is also an object of the invention to provide an improved magnet wire which will pass the ANSI/NEMA magnet wire standards MW1000 and in addition to ANSI/NEMA MG1-Parts 30 and 31 being developed for constant speed motors on a sinusoidal bus and general purpose induction motors used with variable frequency controls, or both, and definite purpose inverter fed motors, respectively.

It is also an object of the invention to provide an improved magnet wire which meets all of the performance characteristics desired by motor manufacturers for stator and rotor windings for use under corona discharge conditions.

Finally, it is an object of the invention to provide an improved magnet wire which possesses all of the above-identified features.

In the broader aspects of the invention, there is provided a pulsed voltage surge resistant magnet wire comprising a conductor, a continuous and concentric and flexible uniform coat of base insulation material superimposed on the conductor. An essentially continuous and concentric and uniform pulsed voltage surge shield overlaying the coat of base insulation material. The shield has therein an effective amount of a particulate material. The shield is superimposed on the coat of base insulation material, and has a continuous and concentric and flexible and uniform top coat of insulation material superimposed thereon.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein.

DESCRIPTION OF A SPECIFIC EMBODIMENT

Figure 1:
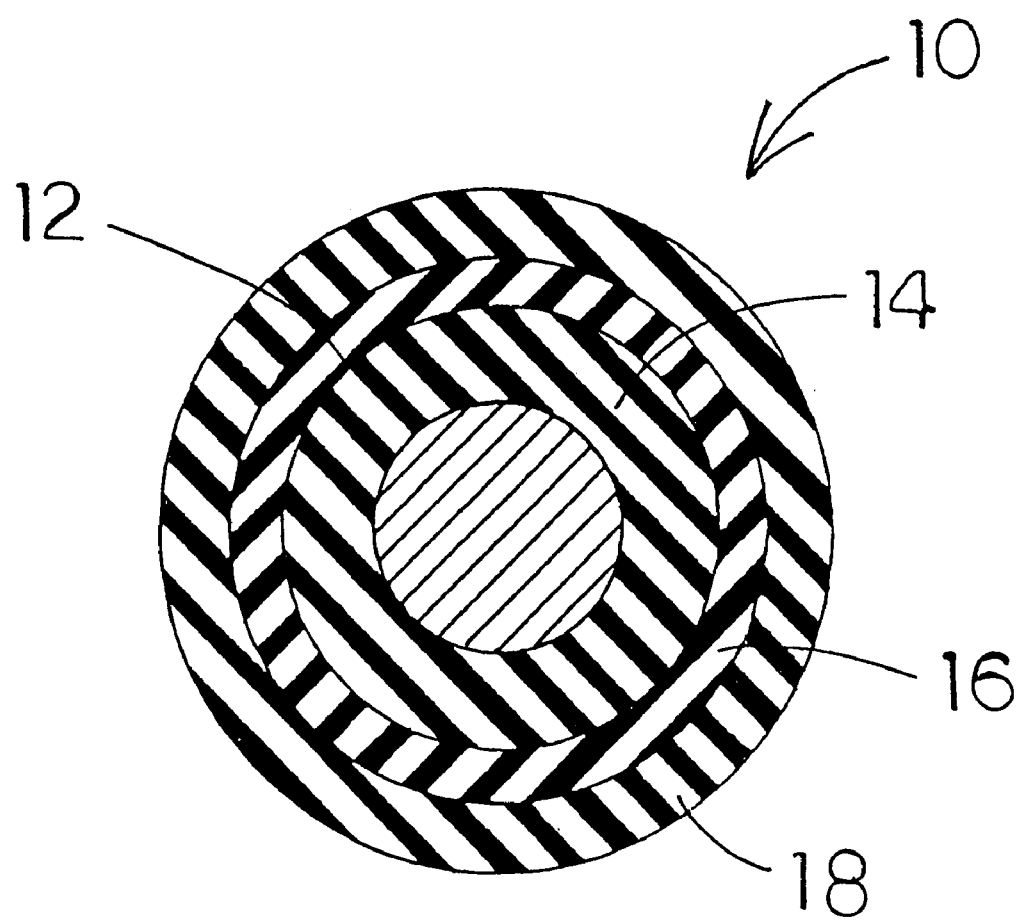
FIG. 1 is a cross-sectional view of a magnet wire showing an electrical conductor having the improved pulsed voltage surge resistant insulation thereon.

The improved magnet wire 10 of the invention includes a conductor 12, a continuous and concentric and flexible and uniform coat of base insulation material 14 and an essentially continuous, concentric and uniform pulse voltage surge shield 16 superimposed on the base insulation material 14. At least one continuous and concentric and flexible and uniform top coat 18 of insulation material is superimposed on the shield 16.

Conductor 12 is a magnet wire conductor meeting all of the dimensional specifications of ANSI/NEMA MW1000 standards. Conductor 12 may be a copper or aluminum conductor in specific embodiments. Base insulation material 14 is applied to the conductor 12 in a conventional manner to provide a continuous and concentric and flexible and uniform coat of base insulation superimposed on the conductor 12.

Insulation material 14 can be of a variety of materials. These materials include polyester, polyamide, polyimide, polyurethane, polyetherimide, polyesteramideimide, epoxy, acrylic, polyamideimide, polyesterimide, NYLON, polyvinyl acetal or FORMVAR and polyarylsulfone materials. Base insulation material 14 may also include multiple coated insulation systems such as that disclosed in U.S. Pat. No. 3,022,200 issued to Koerner et al in which a magnet wire conductor is insulated by an inner coat of polyester resin and an outer coat of an amideimide resin. All heretofore known base insulation materials are encompassed by the invention as the pulse voltage surge shield 16 may be superimposed also upon any conventional or heretofore disclosed, but not commercial, base insulation material and increased resistance to pulsed voltage surge failure would be expected.

A primary property of the improved pulsed voltage surge resistant magnet wire of the invention is that, in all embodiments, the base insulation 14 of the magnet wire is maintained inviolate and merely shielded by shield 16 from degradation due to pulsed volt surges such as above-identified and experienced with variable frequency, PWM and/or inverter drives of AC motors. Thus, the magnet wires of this invention having, for example, polyester base insulations, should perform in all applications as well as the prior art magnet wires comprising a conductor 12 and a polyester base insulation material 14. In addition, the magnet wire of the invention has an extended life in comparison to prior art magnet wire when exposed to pulsed voltage surge resistance in use. Thus, the base insulation of the invention is designed to remain intact throughout the life of the winding, and that the base insulation will perform as designed to appropriately space apart adjacent conductors 12 and to provide the designed in dielectric insulative properties of the base insulation material.

The pulsed voltage surge shield 16 of the magnet wire 10 of the invention comprises a coat of resinous material in which from about 1% to about 65% weight of said shield is a particulate filler having a particle size from about 0.005 microns to about 1 micron. Various particulate fillers can be used in the pulsed voltage surge shield of the invention. These include metal oxides, such as titanium dioxide, alumina, silica, zirconium oxide, zinc oxide, iron oxide, various naturally occurring clays and combinations thereof In specific embodiments, the iron oxides may be BAYFERROX 110 or 150M, the clays may be POLYFIL 90 hydrous clay, WC-426 and TRANSLINK77 anhydrous clay, ASP ULTRAFINE hydrous clay and/or ECC-TEX hydrous clay.

Each of the fillers have a preferred particle range from about 0.01 microns to about 0.1 microns. Each of the fillers also have a preferred surface area measured in square meters per gram of from about 9 to about 250.

The pulsed voltage surge shield 16 of the invention may be superimposed as an essentially continuous and concentric and uniform pulsed volt surge shield overlaying any known base insulation 14 by conventional means such as traditional solvent application, traditional extrusion applications as taught in U.S. Pat. No. 4,393,809, or electrostatic deposition as taught in U.S. Pat. No. 5,279,863. In specific embodiments, the pulsed voltage surge shield of the invention includes from about 5% to about 35% weight powdered filler material of the total applied resin and filler material and from about 5% to about 65% of the filled resinous magnet wire insulation material of the shield 16. The resin binder of the pulsed voltage surge shield 16 may be any conventional magnet wire insulation material such as those above listed with regard to the base insulation material. Additionally, other resinous materials may be used for the pulsed voltage surge shield binder as no insulative properties are relied upon from the pulsed voltage surge shield 16.

The top coat 18 superimposed over the shield 16 of magnet wire 10 may be provided to provide proper mechanical protection for the shield 16 or desired surface properties of the magnet wire. In other magnet wire embodiments 10 of the invention, the resinous binder of the shield 16 provides this protection. In still other embodiments of the magnet wire 10 of the invention, the top coat 18 provides magnet wire surface properties such as lubricity, toughness and scrape resistance and the like allowing the magnet wire to be tailored for specific end uses.

The following examples are presented herein to more fully illustrate the present invention. While specific magnet wire insulation materials and particulate filler materials are described in these examples, it should be understood that each of the above generally identified magnet wire insulation materials and particulate filler materials may be substituted for those disclosed in the examples and/or combinations thereof within reasonable scientific certainty to produce a magnet wire of the invention. Thus, a variety of magnet wires of the invention are possible, all being well within the understanding of persons skilled in the art of magnet wire design, construction and manufacture:

EXAMPLE I

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

50 grams of fumed titanium dioxide (TiO2) particulate filler having an average particle size of 0.021 microns and a surface area of 35 square meters per gram was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amideimide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE II

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

150 grams of fumed titanium dioxide (TiO2) particulate filler having an average particle size of 0.021 microns and a surface area of 35 square meters per gram was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE III

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

300 grams of fumed titanium dioxide (TiO2) particulate filler having an average particle size of 0.021 microns and a surface area of 35 square meters per gram was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE IV

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

50 grams of fumed alumina ($Al_2O3$) particulate filler having an average particle size of 0.013 microns and a surface area of 85 square meters per gram was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE V

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

150 grams of fumed alumina ($Al_2O3$) particulate filler having an average particle size of 0.013 microns and a surface area of 85 square meters per gram was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE VI

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

300 grams of fumed alumina ($Al_2O3$) particulate filler having an average particle size of 0.013 microns and a surface area of 85 square meters per gram was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE VII

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

16 grams of fumed silica ($SiO_2$) particulate filler having an average particle size of 0.016 microns and a surface area of about 90 to about 130 square meters per gram was added to 1,600 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE VIII

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

80 grams of fumed silica ($SiO_2$) particulate filler having an average particle size of 0.016 microns and a surface area of about 90 to about 130 square meters per gram was added to 1,600 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE IX

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

160 grams of fumed silica ($SiO_2$) particulate filler having an average particle size of 0.016 microns and a surface area of about 90 to about 130 square meters per gram was added to 1,600 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE X

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, eight passes were applied in this manner resulting in an insulation build of approximately 2.3 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XI

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, eight passes were applied in this manner resulting in an insulation build of approximately 2.3 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XII

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.9 mils.

150 grams of zinc oxide (ZnO) particulate filler having an average particle size of 0.12 microns and a surface area of 90 square meters per gram was added to 2,584 grams of a conventional polyester magnet wire enamel comprising 38.2% weight resin in a commercially available cresol, phenol and aromatic hydrocarbon solvent were intimately mixed in a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XIII

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.9 mils.

450 grams of zinc oxide (ZnO) particulate filler having an average particle size of 0.12 microns and a surface area of 90 square meters per gram was added to 2,584 grams of a conventional polyester magnet wire enamel comprising 38.2% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XIV

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.9 mils.

900 grams of zinc oxide (ZnO) particulate filler having an average particle size of 0.12 microns and a surface area of 90 square meters per gram was added to 2,584 grams of a conventional polyester magnet wire enamel comprising 38.2% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XV

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.9 mils.

600 grams of zinc oxide (ZnO) particulate filler having an average particle size of 0.12 microns and a surface area of 90 square meters per gram was added to 2,584 grams of a conventional polyester magnet wire enamel comprising 38.2% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XVI

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

100 grams of equal parts of fumed titanium dioxide, fumed alumina and zinc oxide particulate filler having an average particle size of 0.016 microns and an average surface area of 92 square meters per gram was added to 2,580 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XVII

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

300 grams of equal parts of fumed titanium dioxide, fumed alumina and zinc oxide particulate filler having an average particle size of 0.016 microns and an average surface area of 92 square meters per gram was added to 2,580 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XVIII

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

400 grams of equal parts of fumed titanium dioxide, fumed alumina and zinc oxide particulate filler having an average particle size of 0.016 microns and an average surface area of 92 square meters per gram was added to 2,580 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XIX

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

75 grams of WC-426 clay particulate filler having an average particle size of 0.7 microns and a surface area of 13 to about 17 square meters per gram was added to 1,500 grams of a conventional polyester magnet wire enamel comprising 38.2% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XX

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

250 grams of WC-426 clay particulate filler having an average particle size of 0.7 microns and a surface area of 13 to about 17 square meters per gram was added to 1,500 grams of a conventional polyester magnet wire enamel comprising 38.2% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXI

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

25 grams of fumed titanium dioxide ($TiO_2$) particulate filler having an average particle size of 0.021 microns and a surface area of 35 square meters per gram was added to 1,200 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXII

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

75 grams of fumed titanium dioxide ($TiO_2$) particulate filler having an average particle size of 0.021 microns and a surface area of 35 square meters per gram was added to 1,200 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXIII

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

125 grams of fumed titanium dioxide ($TiO_2$) particulate filler having an average particle size of 0.021 microns and a surface area of 35 square meters per gram was added to 1,200 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXIV

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

25 grams of fumed alumina ($Al_2O3$) particulate filler having an average particle size of 0.013 microns and a surface area of 85 square meters per gram was added to 1,200 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXV

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

75 grams of fumed alumina ($Al_2O3$) particulate filler having an average particle size of 0.013 microns and a surface area of 85 square meters per gram was added to 1,200 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXVI

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

150 grams of fumed alumina ($Al_2O3$) particulate filler having an average particle size of 0.013 microns and a surface area of 85 square meters per gram was added to 1,200 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXVII

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

16 grams of fumed silica ($SiO_2$) particulate filler having an average particle size of 0.016 microns and a surface area of about 90 to about 130 square meters per gram was added to 1,600 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXVIII

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

80 grams of fumed silica ($SiO_2$) particulate filler having an average particle size of 0.016 microns and a surface area of about 90 to about 130 square meters per gram was added to 1,600 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 22 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXIX

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

160 grams of fumed silica ($SiO_2$) particulate filler having an average particle size of 0.016 microns and a surface area of about 90 to about 130 square meters per gram was added to 1,600 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXX

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.9 mils.

49 grams of zinc oxide (ZnO) particulate filler having an average particle size of 0.12 microns and a surface area of 90 square meters per gram was added to 2,584 grams of a polyarylsulfone magnet wire enamel comprising 21% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXXI

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.9 mils.

450 grams of zinc oxide (ZnO) particulate filler having an average particle size of 0.12 microns and a surface area of 90 square meters per gram was added to 2,584 grams of a polyarylsulfone magnet wire enamel comprising 21% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXXII

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.9 mils.

900 grams of zinc oxide (ZnO) particulate filler having an average particle size of 0.12 microns and a surface area of 90 square meters per gram was added to 2,584 grams of a polyarylsulfone magnet wire enamel comprising 21% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXXIII

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, twelve passes were applied in this manner resulting in an insulation build of approximately 3.0 mils.

The properties of the resultant magnet wire are shown in Table I.

EXAMPLE XXXIV

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, eight passes were applied in this manner resulting in an insulation build of approximately 1.9 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXXV

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

1,677 grams of equal parts of fumed titanium dioxide, fumed alumina and zinc oxide particulate filler having an average particle size of 0.016 microns and an average surface area of 92 square meters per gram was added to 2,580 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXXVI

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

837 grams of equal parts of fumed titanium dioxide, fumed alumina and zinc oxide particulate filler having an average particle size of 0.016 microns and an average surface area of 92 square meters per gram was added to 2,580 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXXVII

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

140 grams of equal parts of fumed titanium dioxide, fumed alumina and zinc oxide particulate filler having an average particle size of 0.016 microns and an average surface area of 92 square meters per gram was added to 2,580 grams of a polyarylsulfone magnet wire enamel comprising 21% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXXVIII

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

75 grams of WC-426 clay particulate filler having an average particle size of 0.7 microns and a surface area of 13 to about 17 square meters per gram was added to 1,500 grams of a polyarylsulfone magnet wire enamel comprising 21% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XXXIX

A polyarylsulfone magnet wire enamel comprising 21% weight resin in commercially available cresol, phenol and aromatic hydrocarbon solvent as applied to a bare 18 AWG copper magnet wire conductor having no insulation thereon employing dyes in a conventional magnet wire coating tower at 16 meters per minute having temperatures of 450° F., 500° F. and 550° F., respectively, six passes were applied in this manner resulting in an insulation build of approximately 1.8 mils.

450 grams of WC-426 clay particulate filler having an average particle size of 0.7 microns and a surface area of 13 to about 17 square meters per gram was added to 1,500 grams of a polyarylsulfone magnet wire enamel comprising 21% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 16 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XL

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

60 grams of iron oxide (Fe2O3) particulate filler having an average particle size of 0.09 microns was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F.

and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XLI

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

120 grams of iron oxide (Fe2O3) particulate filler having an average particle size of 0.09 microns was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XLII

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

240 grams of iron oxide (Fe2O3) particulate filler having an average particle size of 0.09 microns was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XLIII

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

60 grams of fumed zirconium oxide ($Zr_2O_3$) particulate filler having an average particle size of 0.03 microns and a surface area of about 30 to 50 square meters per gram was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XLIV

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

126 grams of fumed zirconium oxide ($Zr_2O_3$) particulate filler having an average particle size of 0.03 microns and a surface area of about 30 to 50 square meters per gram was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XLV

A conventional polyester magnet wire enamel comprising 38.2% weight resin in commercially available cresol, phenol and aromatic hydrocarbon solvent as applied to a bare 18 AWG copper magnet wire conductor having no insulation thereon employing dyes in a conventional magnet wire coating tower at 34 meters per minute having temperatures of 450° F., 500° F. and 550° F., respectively, six passes were applied in this manner resulting in an insulation build of approximately 1.8 mils.

240 grams of fumed zirconium oxide ($Zr_2O_3$) particulate filler having an average particle size of 0.03 microns and a surface area of about 30 to 50 square meters per gram was added to 1,200 grams of a conventional polyester magnet wire enamel comprising 38.2% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 34 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XLVI

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

25 grams of fumed titanium dioxide ($TiO_2$) particulate filler having an average particle size of 0.021 microns and a surface area of 35 square meters per gram was added to 1,200 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XLVII

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

75 grams of fumed titanium dioxide ($TiO_2$) particulate filler having an average particle size of 0.021 microns and a surface area of 35 square meters per gram was added to 1,200 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XLVIII

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

150 grams of fumed titanium dioxide ($TiO_2$) particulate filler having an average particle size of 0.021 microns and a surface area of 35 square meters per gram was added to 1,200 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE XLIX

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

27 grams of fumed alumina ($Al_2O3$) particulate filler having an average particle size of 0.013 microns and a surface area of 85 square meters per gram was added to 1,000 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE L

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

80 grams of fumed alumina ($Al_2O3$) particulate filler having an average particle size of 0.013 microns and a surface area of 85 square meters per gram was added to 1,000 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LI

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

160 grams of fumed alumina ($Al_2O_3$) particulate filler having an average particle size of 0.013 microns and a surface area of 85 square meters per gram was added to 1,000 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LII

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

10 grams of fumed silica ($SiO_2$) particulate filler having an average particle size of 0.016 microns and a surface area of about 90 to about 130 square meters per gram was added to 1,600 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LIII

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

25 grams of fumed silica ($SiO_2$) particulate filler having an average particle size of 0.016 microns and a surface area of about 90 to about 130 square meters per gram was added to 1,600 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LIV

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

50 grams of fumed silica ($SiO_2$) particulate filler having an average particle size of 0.016 microns and a surface area of about 90 to about 130 square meters per gram was added to 1,600 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LV

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

25 grams of zinc oxide (ZnO) particulate filler having an average particle size of 0.12 microns and a surface area of 90 square meters per gram was added to 2,584 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LVI

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

50 grams of zinc oxide (ZnO) particulate filler having an average particle size of 0.12 microns and a surface area of 90 square meters per gram was added to 2,584 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LVII

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

100 grams of zinc oxide (ZnO) particulate filler having an average particle size of 0.12 microns and a surface area of 90 square meters per gram was added to 2,584 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LVIII

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, twelve passes were applied in this manner resulting in an insulation build of approximately 3.0 mils.

The properties of the resultant magnet wire are shown in Table I.

EXAMPLE LIX

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, eight passes were applied in this manner resulting in an insulation build of approximately 2.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LX

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

210 grams of equal parts of fumed titanium dioxide, fumed alumina and zinc oxide particulate filler having an average particle size of 0.016 microns and an average surface area of 92 square meters per gram was added to 2,580 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LXI

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

600 grams of equal parts of fumed titanium dioxide, fumed alumina and zinc oxide particulate filler having an average particle size of 0.016 microns and an average surface area of 92 square meters per gram was added to 2,580 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LXII

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

300 grams of equal parts of fumed titanium dioxide, fumed alumina and zinc oxide particulate filler having an average particle size of 0.016 microns and an average surface area of 92 square meters per gram was added to 2,580 grams of a conventional FORMVAR magnet wire enamel comprising 16% weight resin in a commercially available cresol, phenol and aromatic hydrocarbon solvent were intimately mixed by stirring at high speed to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LXIII

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

35 grams of WC-426 clay particulate filler having an average particle size of 0.7 microns and a surface area of 13 to about 17 square meters per gram was added to 1,500 grams of a conventional FORMVAR magnet wire enamel comprising 16% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional amide imide magnet wire enamel comprising 28% weight resin in a N-methyl pyrrolidone and aromatic hydrocarbon solvent was than applied over the previously insulated conductor having both a continuous, concentric, flexible and uniform coat of base insulation material thereon. The pulsed voltage surge shield of the invention superimposed thereon by employing dyes and a conventional magnet wire coating tower at 36 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

EXAMPLE LXIV

A conventional FORMVAR magnet wire enamel comprising 16% weight resin in commercially available cresol, phenol and aromatic hydrocarbon solvent as applied to a bare 18 AWG copper magnet wire conductor having no insulation thereon employing dyes in a conventional magnet wire coating tower at 32 meters per minute having temperatures of 450° F., 500° F. and 550° F., respectively, six passes were applied in this manner resulting in an insulation build of approximately 1.8 mils.

100 grams of WC-426 clay particulate filler having an average particle size of 0.7 microns and a surface area of 13 to about 17 square meters per gram was added to 1,500 grams of a conventional FORMVAR magnet wire enamel comprising 16% weight resin in a commercially available cresol, phenol and aromatic hydrocarbon solvent were intimately mixed by a conventional ball mill to disperse the particulate filler throughout the enamel. The resultant enamel was then applied to the previously insulated magnet wire conductor having a continuous, concentric and flexible uniform coat of base insulation material thereon by employing dyes and a conventional magnet wire coating tower at 32 meters per minute, having temperatures of 450° F., 500° F. and 550° F., respectively, 2 passes were applied in this manner to place on the previously insulated conductor the pulsed voltage surge shield of the invention resulting in an insulation build of approximately 0.4 mils.

A conventional NYLON magnet wire enamel comprising 20% resin weight in a phenol, cresol and aromatic hydrocarbon solvent was then applied over the previously insulated conductor having both a continuous, concentric, flexible and uniform coat of base insulation material thereon and the pulsed voltage surge shield of the invention superimposed thereon by employing dyes and a conventional magnet wire coating tower at 31 meters per minute, having temperatures of 450° F., 500° F. and 550° F., respectively. Two passes were applied in this manner resulting in an insulation build of approximately 0.6 to 0.8 mils.

The properties of the resultant magnet wire are shown in Table I.

The specific test equipment utilized includes a laboratory oven in which a sample cell is positioned. The sample cell is connected in series to a pulse generator and a signal conditioner. The signal conditioner and the pulse generator are connected to an oscilloscope. A bipolar power supply is connected in parallel to the sample cell and the oscilloscope between the pulse generator and the signal conditioner. In the specific test facility utilized, peak to peak voltage could be varied from 1,000 to 5,000 volts, repetitive frequency could be varied from 60 Hz to 20 kHz, and rise time of the pulse could be varied from 60 nano seconds to 250 nano seconds for a pulse of 5,000 volts.

A standard twisted wire pair was used for each test. The twisted wire pair was mounted in the sample cell. 18 AWG wire was used in each test. Each wire pair was twisted 8 revolutions. The insulation was stripped off at each end of the twisted pair. The remaining conductor portion was used as an electrode. One end of the wire was connected to the positive output of the pulse generator, and the other end to the negative output of the pulse generator. The other side of the twisted pair were kept apart.

The magnet wire made in accordance with Examples I through LXIV hereinabove were tested in accordance with the pulsed voltage surge resistant magnet wire test in which a twisted pair of insulated conductors of the invention were subjected to a pulsed wave at a frequency of 20 kHz at temperatures ranging from 30° C. to 90° C. having a 50% duty cycle as shown in Table I. All of the data reported was at a rate of rise of 83 kV per microsecond. The electrical stress applied to the twisted pair ranged from 0.7 to 1 kV per mil. The extended life of the pulsed voltage surge resistant magnet wire is shown to be ten-fold over the magnet wire without the pulsed voltage surge resistant shield of the invention.

The improved magnet wire of the invention provides an improved magnet wire for use in such AC motors which has increased resistance to insulation degradation caused by pulsed voltage surges. The improved magnet wire of the invention provides an improved magnet wire which can withstand voltage surges approaching 3,000 volts having rates of rise of about 1.0 kV per micro second to about 100 kv per micro second temperatures for short periods of time of about 300° C. after the insertion of the windings in a motor rotor and stator over anticipated lifetime of the motor. The improved magnet wire of the invention provides an improved magnet wire which will pass all of the dimensional ANSI/NEMA magnet wire standards MW 1000 and in addition NEMA MG1-Parts 30 and 31 for constant speed motors on a sinusoidal bus and general purpose motors used with variable frequency controls, or both, and definite purpose inverter fed motors, respectively. The improved magnet wire of the invention provides an improved magnet wire which meets all of the performance characteristics desired by motor manufacturers for stator and rotor windings for use under corona discharge conditions.

TABLE I

| Example | I | II | III | IV | V | VI |
|---|---|---|---|---|---|---|
| Speed - mpm | 34 | 34 | 34 | 34 | 34 | 34 |
| Surface rating | 1.1 | 1.2 | 1.1 | 1.3 | 1.1 | 1.3 |
| Insulation build - mils | 3.0 | 2.9–3.0 | 3.0–3.1 | 3.0 | 3.0 | 3.0–3.1 |
| Elongation - % | 41 | 42 | 40 | 43 | 42 | 40 |
| Mandrel Flex | 30% 1x OK | 35% 3x OK | 25% 5x OK | 20% 1x OK | 30% 3x OK | 20% 5x OK |
| Snap | OK | OK | OK | OK | OK | OK |
| Snap Flex | OK 1x | OK 1x | OK 3x | OK 1x | OK 3x | OK 3x |
| Dielectric Breakdown - V | 12,220 | 11,730 | 10.820 | 12,100 | 11,680 | 10.470 |
| Time to Fail 20 kHz, 2 kV, 90° C., 50% Duty Cycle, | >40,000 | >60,000 | >70,000 | >40,000 | >60,000 | >70,000 |
| Size, AWG | 18 | 18 | 18 | 18 | 18 | 18 |
| Conductor | Copper | Copper | Copper | Copper | Copper | Copper |

| Example | VII | VIII | IX | X | XI | XII |
|---|---|---|---|---|---|---|
| Speed - mpm | 34 | 34 | 34 | 34 | 34 | 34 |
| Surface rating | 1.1 | 1.1 | 1.2 | 1.2 | 1.1 | 1.1 |

TABLE I-continued

| | | | | | | |
|---|---|---|---|---|---|---|
| Insulation build - mils | 3.0 | 2.9–3.0 | 3.0–3.1 | 3.0 | 2.9–3.0 | 3.0–3.1 |
| Elongation - % | 42 | 40 | 41 | 41 | 42 | 40 |
| Mandrel Flex | 30% 1× OK | 30% 3× OK | 30% 5× OK | 1× OK | 1× OK | 2× OK |
| Snap | OK | OK | OK | OK | OK | OK |
| Snap Flex | OK 1× | OK 3× | OK 6× | OK 1× | OK 1× | OK 2× |
| Dielectric Breakdown - V | 11,809 | 11,250 | 10.250 | 11,980 | 12,520 | 10.580 |
| Time to Fail 20 kHz, 2 kV, 90° C., 50% Duty Cycle, | >40,000 | >60,000 | >70,000 | 566 80° C. | 666 80° C. | >40,000 |
| Size, AWG | 18 | 18 | 18 | 18 | 18 | 18 |
| Conductor | Copper | Copper | Copper | Copper | Copper | Copper |

| Example | XIII | XIV | XV | XVI | XVII | XVIII |
|---|---|---|---|---|---|---|
| Speed - mpm | 34 | 34 | 34 | 34 | 34 | 34 |
| Surface rating | 1.2 | 1.1 | 1.3 | 1.1 | 1.1 | 1.3 |
| Insulation build - mils | 2.9–3.0 | 3.0 | 2.9–3.0 | 3.0–3.1 | 3.0 | 3.0 |
| Elongation - % | 42 | 41 | 40 | 40 | 40 | 40 |
| Mandrel Flex | 30% 4× OK | 35% 5× OK | 30% 6× OK | 25% 5× OK | 30% 5× OK | 30% 6× OK |
| Snap | OK | OK | OK | OK | OK | OK |
| Snap Flex | OK 4× | OK 6× | OK 7× | OK 3× | OK 6× | OK 6× |
| Dielectric Breakdown - V | 10,980 | 11,250 | 11,000 | 10,400 | 11,860 | 10.750 |
| Time to Fail 20 kHz, 2 kV, 90° C., 50% Duty Cycle, | >50,000 | >70,000 | >80,000 | >30,000 | >30,000 | >30,000 |
| Size, AWG | 18 | 18 | 18 | 18 | 18 | 18 |
| Conductor | Copper | Copper | Copper | Copper | Copper | Copper |

| Example | XIX | XX | XXI | XXII | XXIII | XXIV |
|---|---|---|---|---|---|---|
| Speed - mpm | 34 | 34 | 16 | 16 | 16 | 16 |
| Surface rating | 1.1 | 1.1 | 1.3 | 1.2 | 1.2 | 1.3 |
| Insulation build - mils | 3.0 | 3.0 | 3.0 | 3.0 | 3.0 | 3.0 |
| Elongation - % | 40 | 41 | 42 | 40 | 41 | 40 |
| Mandrel Flex | 20% 1× OK | 20% 1× OK | 20% 1× OK | 20% 3× OK | 20% 5× OK | 20% 1× OK |
| Snap | OK | OK | OK | OK | OK | OK |
| Snap Flex | OK 5× | OK 5× | OK 1× | OK 3× | OK 6× | OK 1× |
| Dielectric Breakdown - V | 10,580 | 8,100 | 5,850 | 6,100 | 7,480 | 6.375 |
| Time to Fail 20 kHz, 2 kV, 90° C., 50% Duty Cycle, | >3,000 | >4,000 | >6,000 | >12,000 | >20,000 | >4,000 |
| Size, AWG | 18 | 18 | 18 | 18 | 18 | 18 |
| Conductor | Copper | Copper | Copper | Copper | Copper | Copper |

| Example | XXV | XXVI | XXVII | XXVIII | XXIX | XXX |
|---|---|---|---|---|---|---|
| Speed - mpm | 16 | 16 | 16 | 16 | 16 | 16 |
| Surface rating | 1.3 | 1.2 | 1.2 | 1.3 | 1.2 | 1.3 |
| Insulation build - mils | 3.0 | 2.9–3.0 | 3.0 | 3.0 | 3.0 | 3.1 |
| Elongation - % | 41 | 42 | 40 | 42 | 42 | 40 |
| Mandrel Flex | 30% 3× OK | 30% 5× OK | 30% 1× OK | 30% 3× OK | 30% 5× OK | 30% 2× OK |
| Snap | OK | OK | OK | OK | OK | OK |
| Snap Flex | OK 3× | OK 5× | OK 1× | OK 3× | OK 6× | OK 2× |
| Dielectric Breakdown - V | 7,180 | 7,360 | 6,340 | 6,120 | 6,820 | 5,950 |
| Time to Fail 20 kHz, 2 kV, 90° C., 50% Duty Cycle, | >12,000 | >20,000 | >4,000 | >12,000 | >20,000 | >40,000 |
| Size, AWG | 18 | 18 | 18 | 18 | 18 | 18 |
| Conductor | Copper | Copper | Copper | Copper | Copper | Copper |

| Example | XXXI | XXXII | XXXIII | XXXIV | XXXV | XXXVI |
|---|---|---|---|---|---|---|
| Speed - mpm | 16 | 16 | 16 | 16 | 16 | 16 |

TABLE I-continued

| | | | | | | |
|---|---|---|---|---|---|---|
| Surface rating | 1.2 | 1.3 | 1.2 | 1.2 | 1.3 | 1.3 |
| Insulation build - mils | 3.0 | 3.0 | 3.0 | 3.0 | 3.0 | 3.0 |
| Elongation - % | 40 | 40 | 41 | 42 | 40 | 40 |
| Mandrel Flex | 30% 3× OK | 30% 5× OK | 30% 1× OK | 30% 1× OK | 30% 3× OK | 30% 5× OK |
| Snap | OK | OK | OK | OK | OK | OK |
| Snap Flex | OK 3× | OK 6× | OK 1× | OK 1× | OK 3× | OK 5× |
| Dielectric Breakdown - V | 6,750 | 5,650 | 6,100 | 5,850 | 6,550 | 5,700 |
| Time to Fail 20 kHz, 2 kV, 90° C., 50% Duty Cycle, | >60,000 | >70,000 | 94 | 96 | >25,000 | >25,000 |
| Size, AWG | 18 | 18 | 18 | 18 | 18 | 18 |
| Conductor | Copper | Copper | Copper | Copper | Copper | Copper |

| Example | XXXVII | XXXVIII | XXXIX | XL | XLI | XLII |
|---|---|---|---|---|---|---|
| Speed - mpm | 16 | 16 | 16 | 34 | 34 | 34 |
| Surface rating | 1.3 | 1.2 | 1.2 | 1.3 | 1.1 | 1.2 |
| Insulation build - mils | 3.0 | 3.0 | 3.0 | 3.0 | 3.0 | 2.9–3.0 |
| Elongation - % | 40 | 42 | 41 | 40 | 46 | 46 |
| Mandrel Flex | 30% 6× OK | 30% 6× OK | 30% 6× OK | 30% 2× OK | 30% OK | 30% OK |
| Snap | OK | OK | OK | OK | OK | OK |
| Snap Flex | OK 6× | OK 6× | OK 6× | OK 2× | OK 3× | OK 3× |
| Dielectric Breakdown - V | 5,650 | 6,700 | 6,560 | 6,650 | 11,300 | 10,900 |
| Time to Fail 20 kHz, 2 kV, 90° C., 50% Duty Cycle, | >25,000 | >3,000 | >6,000 | >40,000 | >60,000 | >70,000 |
| Size, AWG | 18 | 18 | 18 | 18 | 18 | 18 |
| Conductor | Copper | Copper | Copper | Copper | Copper | Copper |

| Example | XLIII | XLIV | XLV | XLVI | XLVII | XLVIII |
|---|---|---|---|---|---|---|
| Speed - mpm | 34 | 34 | 34 | 32 | 32 | 32 |
| Surface rating | 1.1 | 1.1 | 1.1 | 1.1 | 1.1 | 1.1 |
| Insulation build - mils | 3.0 | 3.0 | 3.0 | 3.0 | 3.0 | 3.0 |
| Elongation - % | 46 | 46 | 46 | 46 | 35 | 35 |
| Mandrel Flex | 30% OK | 30% 2× OK | 30% 4× OK | 30% 5× OK | 30% 1× OK | 30% 1× OK |
| Snap | OK | OK | OK | OK | OK | OK |
| Snap Flex | OK 3× | OK 2× | OK 4× | OK 5× | OK 1× | OK 1× |
| Dielectric Breakdown - V | 10,190 | 11,200 | 11,920 | 10,650 | 10,750 | 10,560 |
| Time to Fail 20 kHz, 2 kV, 90° C., 50% Duty Cycle, | >40,000 | >60,000 | >70,000 | >40,000 | >55,000 | >75,000 |
| Size, AWG | 18 | 18 | 18 | 18 | 18 | 18 |
| Conductor | Copper | Copper | Copper | Copper | Copper | Copper |

| Example | XLIX | L | LI | LII | LIII | LIV |
|---|---|---|---|---|---|---|
| Speed - mpm | 32 | 32 | 32 | 32 | 32 | 32 |
| Surface rating | 1.1 | 1.1 | 1.1 | 1.1 | 1.1 | 1.1 |
| Insulation build - mils | 3.0 | 3.0 | 3.0 | 3.0 | 3.0 | 3.0 |
| Elongation - % | 35 | 35 | 40 | 40 | 40 | 40 |
| Mandrel Flex | 30% 2× OK | 30% 2× OK | 30% 1× OK | 30% 1× OK | 30% 1× OK | 30% |
| Snap | OK | OK | OK | OK | OK | OK |
| Snap Flex | OK 2× | OK 2× | OK 1× | OK 1× | OK 1× | OK 1× |
| Dielectric Breakdown - V | 14,300 | 13,750 | 10,680 | 10.120 | 10,980 | 10,350 |
| Time to Fail 20 kHz, 2 kV, 90° C., 50% Duty Cycle, | >40,000 | >55,000 | >70,000 | >40,000 | >55,000 | >70,000 |
| Size, AWG | 18 | 18 | 18 | 18 | 18 | 18 |
| Conductor | Copper | Copper | Copper | Copper | Copper | Copper |

TABLE I-continued

| Example | LV | LVI | LVII | LVIII | LIX | LX |
|---|---|---|---|---|---|---|
| Speed - mpm | 32 | 32 | 32 | 32 | 32 | 32 |
| Surface rating | 1.1 | 1.1 | 1.1 | 1.1 | 1.1 | 1.1 |
| Insulation build - mils | 3.0 | 3.0 | 3.0 | 3.0 | 3.0 | 3.0 |
| Elongation - % | 40 | 40 | 40 | 40 | 40 | 40 |
| Mandrel Flex | OK 1× | OK 1× | OK 1× | OK 1× | OK 1× | OK 1× |
| Snap | OK | OK | OK | OK | OK | OK |
| Snap Flex | OK 1× | OK 1× | OK 1× | OK 1× | OK 1× | OK 1× |
| Dielectric Breakdown - V | 10,750 | 10,975 | 10,870 | 10,970 | 11,570 | 11,280 |
| Time to Fail 20 kHz, 2 kV, 90° C., 50% Duty Cycle, | >40,000 | >20,000 | >70,000 | 380 80° C. | 461 80° C. | >30,000 |
| Size, AWG | 18 | 18 | 18 | 18 | 18 | 18 |
| Conductor | Copper | Copper | Copper | Copper | Copper | Copper |

| Example | LXI | LXII | LXIII | LXIV |
|---|---|---|---|---|
| Speed - mpm | 32 | 32 | 32 | 32 |
| Surface rating | 1.1 | 1.1 | 1.1 | 1.1 |
| Insulation build - mils | 3.0 | 3.0 | 3.0 | 3.0 |
| Elongation - % | 40 | 40 | 40 | 40 |
| Mandrel Flex | OK 1× | OK 1× | OK 1× | OK 1× |
| Snap | OK | OK | OK | OK |
| Snap Flex | OK 1× | OK 1× | OK 1× | OK 1× |
| Dielectric Breakdown - V | 11,200 | 10,960 | 11,200 | 10,100 |
| Time to Fail 20 kHz, 2 kV, 90° C., 50% Duty Cycle, | >30,000 | >30,000 | >30,000 | >5,000 |
| Size, AWG | 18 | 18 | 18 | 18 |
| Conductor | Copper | Copper | Copper | Copper |

While there have been described above principles of the invention in connection with a specific magnet wire insulating materials and specific particulate fillers, it is to be clearly understood that this description is made only by way of example, and not as a limitation of the scope of the invention.

What is claimed is:

1. A pulsed voltage surge resistant magnet wire comprising a conductor, a continuous and concentric and flexible uniform coat of base insulation material superimposed on said conductor, an essentially continuous and concentric and uniform pulsed voltage surge shield superimposed on said coat, said shield comprising a continuous, concentric and essentially uniform layer of particulate material and binder overlaying said coat of insulation material, said shield having from about 1% to about 65% by weight of said particulate material uniformly disbursed throughout said binder, and a continuous and concentric and flexible and uniform top coat of insulation material superimposed on said shield, said conductor and said coats and shield being in compliance with ANSI/NEMA MW 1000 1993.

2. The magnet wire of claim 1 wherein said insulation material is chosen from the group of polymeric materials consisting of polyamides, polyimides, polyamideimides, polyesters, polyesterimide, polyetherimides, polyesteramideimides, polyamide esters, polyimide esters, polyaryl sulfones, polyvinyl acetals, polyurethanes, epoxies, acrylics and combinations thereof.

3. The magnet wire of claim 1 wherein said particulate material has a size from about 0.005 to about 1.0 microns.

4. The magnet wire of claim 1 wherein said particulate material is chosen from the group of materials consisting of metallic oxides, naturally occurring clays, and mixtures thereof.

5. The magnet wire of claim 4 wherein said clays are chosen from the group of said clays consisting of aluminosilicate clays and combinations thereof.

6. The magnet wire of claim 1 wherein said particulate material is chosen from the group of metal oxides consisting of titanium dioxide, alumina, silica, zirconium oxide, zinc oxide, iron oxide and combinations thereof.

7. The magnet wire of claim 1 wherein said particulate material is dispersed throughout said shield.

8. The magnet wire of claim 1 wherein said particulate material is present in said shield from about 10% to about 65% by weight of said shield, the remainder of said shield being said binder.

9. The magnet wire of claim 1 wherein said particulate material is a metallic oxide having a particle size from about 0.01 to about 0.8 microns in an amount of less than about 50% weight of said shield.

10. The magnet wire of claim 1 wherein said binder is chosen from the group of polymeric materials consisting of polyamides, polyimides, polyamideimides, polyesters, polyesterimide, polyetherimides, polyesteramideimides, polyamide esters, polyimide esters, polyaryl sulfones, polyvinyl acetals, polyurethanes, epoxies, acrylics and combinations thereof.

11. A pulsed voltage surge resistant magnet wire comprising a conductor, a continuous and concentric and flexible uniform coat of base insulation material superimposed on said conductor, and an essentially continuous and concentric and uniform pulsed voltage surge shield overlaying said coat, said shield having therein a binder and an effective amount of particulate material to protect said coat and binder from pulsed voltage surge failure, said shield being superimposed on said coat, said particulate of said shield being from about 0.005 microns to about 1 micron in size, and a continuous and concentric and flexible and uniform top coat of insulation material superimposed on said shield, said conductor and said coats and shield being in compliance with ANSI/NEMA MW 1000 1993.

12. The magnet wire of claim 11 wherein said particulate material has a size from about 0.01 to about 0.8 microns.

13. The magnet wire of claim 11 wherein said particulate material is chosen from the group of materials consisting of metallic oxides, naturally occurring clays and mixtures thereof.

14. The magnet wire of claim 13 wherein said clays are chosen from the group of said clays consisting of aluminosilicate clays and combinations thereof.

15. The magnet wire of claim 11 wherein said particulate material is chosen from the group of metal oxides consisting of titanium dioxide, alumina, silica, zirconium oxide, zinc oxide, iron oxide and combinations thereof.

16. The magnet wire of claim 11 wherein said shield comprises said particulate material present in said binder from about 1% to about 65% by weight of said shield, the remainder of said shield being said binder.

17. The magnet wire of claim 11 wherein said particulate material is a metallic oxide having a particle size from about 0.01 to about 0.8 microns in an amount of less than about 50% weight of said shield.

18. The magnet wire of claim 11 wherein said insulation material is chosen from the group of polymeric materials consisting of polyamides, polyimides, polyamideimides, polyesters, polyesterimide, polyetherimides, polyesteramideimides, polyamide esters, polyimide esters, polyaryl sulfones, polyvinyl acetals, polyurethanes, epoxies, acrylics and combinations thereof.

19. A magnet wire comprising a conductor, a continuous and concentric and flexible uniform coat of base insulation material superimposed on said conductor, an essentially continuous and concentric and uniform PWM, variable frequency and/or inverter motor drive pulsed voltage surge shield superimposed on said coat, said shield comprising a continuous, concentric and essentially uniform layer of particulate material and binder overlaying said coat of insulation material, said shield having from about 1% to about 65% by weight of said particulate material uniformly dispersed throughout said binder, and a continuous and concentric and flexible and uniform top coat of insulation material superimposed on said shield, said conductor and said coats and shield being in compliance with ANSI/NEMA MW 1000 1993.

20. The magnet wire of claim 19 wherein said insulation material is chosen from the group of polymeric materials consisting of polyamides, polyimides, polyamideimides, polyesters, polyesterimide, polyetherimides, polyesteramideimides, polyamide esters, polyimide esters, polyaryl sulfones, polyvinyl acetals, polyurethanes, epoxies, acrylics and combinations thereof.

21. The magnet wire of claim 19 wherein said particles have a size from about 0.005 to about 1.0 microns.

22. The magnet wire of claim 19 wherein said particulate material is chosen from the group of materials consisting of metallic oxides, naturally occurring clays, and mixtures thereof.

23. The magnet wire of claim 22 wherein said clays are chosen from the group of said clays consisting of aluminosilicate clays and combinations thereof.

24. The magnet wire of claim 19 wherein said particulate material is chosen from the group of metal oxides consisting of titanium dioxide, alumina, silica, zirconium oxide, zinc oxide, iron oxide and combinations thereof.

25. The magnet wire of claim 19 wherein said particulate material is dispersed throughout said shield.

26. The magnet wire of claim 19 wherein said particulate material is present in said shield from about 10% to about 65% by weight of said shield, the remainder of said shield being said binder.

27. The magnet wire of claim 19 wherein said particulate filler material is a metallic oxide having a particle size from about 0.01 to about 0.8 microns in an amount of less than 50% weight of said shield.

28. The magnet wire of claim 19 wherein said binder is chosen from the group of polymeric materials consisting of polyamides, polyimides, polyamideimides, polyesters, polyesterimide, polyetherimides, polyesteramideimides, polyamide esters, polyimide esters, polyaryl sulfones, polyvinyl acetals, polyurethanes, epoxies, acrylics and combinations thereof.

29. A magnet wire comprising a conductor, a continuous and concentric and flexible uniform coat of base insulation material superimposed on said conductor, and an essentially continuous and concentric and uniform PWM, variable frequency and/or inverter motor drive pulsed voltage surge shield overlaying said coat, said shield having therein a binder and an effective amount of a particulate material therein to protect said coat and binder from pulse voltage surge failure, said shield being superimposed on said coat, said particulate of said shield being from about 0.005 microns to about 1 micron in size, and a continuous and concentric and flexible and uniform top coat of insulation material superimposed on said shield, said conductor and said coats and shield being in compliance with ANSI/NEMA MW 1000 1993.

30. The magnet wire of claim 29 wherein said particulate material has a size from about 0.01 to about 0.8 microns.

31. The magnet wire of claim 29 wherein said particulate material is chosen from the group of materials consisting of metallic oxides, naturally occurring clays and mixtures thereof.

32. The magnet wire of claim 31 wherein said clays are chosen from the group of said clays consisting of aluminosilicate clays and combinations thereof.

33. The magnet wire of claim 29 wherein said particulate material is chosen from the group of metal oxides consisting of titanium dioxide, alumina, silica, zirconium oxide, zinc oxide, iron oxide and combinations thereof.

34. The magnet wire of claim 29 wherein said shield comprises said particulate material present in said binder from about 10% to about 65% by weight of said shield, the remainder of said shield being said binder.

35. The magnet wire of claim 29 wherein said particulate material is a metallic oxide having a particle size from about 0.01 to about 0.8 microns in an amount of less than about 50% weight of said shield.

36. The magnet wire of claim 29 wherein said insulation material is chosen from the group of polymeric materials consisting of polyamides, polyimides, polyamideimides, polyesters, polyesterimide, polyetherimides, polyesteramideimides, polyamide esters, polyimide esters, polyaryl sulfones, polyvinyl acetals, polyurethanes, epoxies, acrylics and combinations thereof.

* * * * *